United States Patent
Pilu et al.

(10) Patent No.: US 8,068,143 B2
(45) Date of Patent: Nov. 29, 2011

(54) CAMERA APPARATUS WITH SALIENCY SIGNAL GENERATION

(75) Inventors: Maurizio Pilu, Bristol (GB); Stephen Philip Cheatle, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1051 days.

(21) Appl. No.: 10/696,567

(22) Filed: Oct. 30, 2003

(65) Prior Publication Data

US 2004/0141062 A1 Jul. 22, 2004

(30) Foreign Application Priority Data

Oct. 30, 2002 (GB) .................................. 0225304.5

(51) Int. Cl.
*H04N 5/228* (2006.01)
(52) U.S. Cl. .................. 348/220.1; 348/231.3
(58) Field of Classification Search ............... 348/220.1, 348/231.99, 157, 152, 211.99, 211.7, 376, 348/231.2, 231.3, 143, 231.5, 231.1, 222.1; 386/95
See application file for complete search history.

(56) References Cited

U.S. PATENT DOCUMENTS

| | | | |
|---|---|---|---|
| 5,689,442 A | 11/1997 | Swanson et al. | 364/550 |
| 5,956,026 A | 9/1999 | Ratakonda | 345/328 |
| 6,163,338 A * | 12/2000 | Johnson et al. | 348/148 |
| 6,167,186 A * | 12/2000 | Kawasaki et al. | 386/46 |
| 6,614,408 B1 * | 9/2003 | Mann | 345/8 |
| 6,795,642 B2 * | 9/2004 | Matsumoto et al. | 386/109 |
| 2002/0031349 A1 * | 3/2002 | Hayashi | 396/429 |
| 2002/0041757 A1 * | 4/2002 | Takahashi | 386/95 |
| 2002/0118285 A1 * | 8/2002 | Misawa et al. | 348/208.16 |
| 2002/0191952 A1 * | 12/2002 | Fiore et al. | 386/46 |
| 2003/0007079 A1 * | 1/2003 | Sisselman | 348/231.99 |

FOREIGN PATENT DOCUMENTS

| | | |
|---|---|---|
| EP | 0 860 980 A2 | 8/1998 |
| EP | 1 109 132 A2 | 6/2001 |
| GB | 2 380 348 A | 4/2003 |
| JP | 03-109878 | 5/1991 |
| JP | 09-093483 | 4/1997 |
| JP | 2000-023124 | 1/2000 |
| JP | 2001-204030 | 7/2001 |
| JP | 2002-109525 | 4/2002 |
| JP | 2002-262221 | 9/2002 |

(Continued)

OTHER PUBLICATIONS

The American Heritage Dictionary of the English Language, Fourth Edition. 2000 (Definition of "contemporaneous") from http://www.Bartley.com.*

(Continued)

*Primary Examiner* — Nelson D. Hernández Hernández (57) ABSTRACT

An electronic still, video or hybrid camera has a physically or mechanically operable user control receiving an input from a user and generates a binary, continuous or multi-level saliency signal while an image signal is being produced. The user control may be the same as or different from the picture taking control. In real time the saliency signal controls processing of the camera signal, or the camera itself, for example by controlling the frequency of still picture taking, or by optimising image storage in memory. The signal can also be stored with the image signal for later use, as in editing. The user control can be mounted on the camera or remote therefrom and include a movement or pressure sensor.

12 Claims, 2 Drawing Sheets

FOREIGN PATENT DOCUMENTS

WO      WO 00/79800 A1    12/2000

OTHER PUBLICATIONS

Lockerd et al., "LAFCam—Leveraging Affective Feedback Camcorder", Apr. 2002, ACM CHI 2002 Conference on Human Factors in Computing Systems.

Uchihashi et al., "Summarizing Video Using a Shot Importance Measure and a Frame-Packing Algorithm", 1999, pp. 3041-3044, Proc ICASSP (IEEE), vol. 6.

Hoisko, "Context Triggered Visual Episodic Memory Prosthesis", 2000, pp. 185-186, Proc ISWC (IEEE).

Nakamura et al., "Structuring Personal Activity Records based on Attention—Analyzing Videos from Head-mounted Camera", 2000, pp. 1-4, Proc ICPR 2000.

Wang et al., "Video Retrieval and Relevance Feedback in the Context of a Post-Integration Model", Oct. 2001, Workshop on Multi-Media Signal Processing (MMSP2001).

\* cited by examiner

FIG. 5 ously, the time and patience of the user. In such a case, the recorded images are then not used at all, so that potentially interesting images are lost, or all of the data must be viewed, so that the potentially interesting images are lost in a welter of uninteresting material. It can be seen that in either case the provision of too large a storage facility tends to be counterproductive.

CAMERA APPARATUS WITH SALIENCY SIGNAL GENERATION

RELATED APPLICATIONS

The present application is based on, and claims priority from, GB Application No. 0225304.5, filed Oct. 30, 2002, the entire disclosure of which is hereby incorporated by reference herein.

CROSS-REFERENCE TO RELATED APPLICATIONS

Not Applicable

STATEMENT REGARDING FEDERALLY FUNDED RESEARCH OR DEVELOPMENT

Not Applicable

INCORPORATION BY REFERENCE OF MATERIAL SUBMITTED ON COMPACT DISC

Not Applicable

BACKGROUND OF THE INVENTION

1. Technical Field

The present invention relates to electronic camera apparatus comprising an electronic camera for developing an image signal of a viewed scene, whereon an indication of saliency of the viewed scene is developed.

2. Background Art

The electronic camera may be of the still or video variety, or any hybrid version. That is to say it may be adapted for example for providing one or more temporally spaced image frame signals in response to an input command (still camera), or for providing a continuous succession of image frame signals in response to an input command (video camera), or for providing a continuous sequence of image frame signals interspersed with still image signals (where the latter may have greater resolution if desired) (hybrid camera).

Whereas formerly a camera user might be expected to take a great deal of care in composing a picture before recording it at the optimum time, particularly where photographic film was involved, the advent of electronic cameras with digital image recording, and more recently rapid increase in available practical memory size, has increased the ease with which a large number of still images, or a long video sequence, can be recorded electronically. This is tending to lead to situations where a camera is left recording over an extended period of time, with the intention of subsequently sifting through the stored images to select only the more interesting images or sequences for further processing. Such further processing might involve permanent storage, copying, reproduction, transmission and/or printing for example. In addition, the stored images may need to be organised and/or indexed for easy retrieval.

Nevertheless, as the amount of stored image data increases, there comes a point at which the time required to analyse it all eventually outstrips the time and patience of the user. In such a case, the recorded images are then not used at all, so that potentially interesting images are lost, or all of the data must be viewed, so that the potentially interesting images are lost in a welter of uninteresting material. It can be seen that in either case the provision of too large a storage facility tends to be counterproductive.

The commonly assigned UK Patent No. 2380348, issued Oct. 1, 2003, entitled "Determination of Features of Interest by Analysing the Movement of Said Features Over a Plurality of Frames" relates to automated camera apparatus comprising an electronic camera, the camera comprising a photoelectric sensor optically coupled to imaging optics for providing a video signal representative of an image viewed by the camera, and securing means for securing at least the imaging optics on the head of a wearer with its axis generally parallel to the normal forward line of sight of the wearer, the apparatus further comprising video signal processing means arranged to receive said video signal for judging the degree of interest shown by the wearer in a feature in the scene and for providing a related saliency signal, the video signal processing means including image analysis means for identifying the presence of features and their locations relative to a reference position in the frame within each of a series of frames in a time window of the video signal, and movement analysis means coupled to the output of said image analysis means for analysing the movement of at least one said feature over said series of frames to provide said saliency signal.

This apparatus automatically derives a measure of saliency which is then used at the time or later for processing of the images or image signals from the camera. The saliency measure is derived from external cues such as changes in the gaze of the camera user.

Another form of apparatus is described by Andrea Lockerd in "LAFCam—Leveraging Affective Feed back Camcorder", ACM CHI 2002 Conference on Human Factors in Computing Systems, Minneapolis, Minn., Apr. 20-25, 2002. A video camera user wears a head mounted camera turned to view the facial expression of the user, a glove for sensing skin conductivity and a head mounted microphone for detecting laughter. The latter two can be used as saliency indicators when reviewing or editing the resulting video, and the facial expression can be presented as a picture within the video image for the same purpose. However, each of these measures is principally that of an involuntary action, not under the control of the user.

Other patent disclosures where a saliency or related measure is automatically determined include European Patent Application No. EP 1 109 132 (Eastman Kodak); U.S. Pat. No. 5,956,026 (Sharp); and International Patent Application No. WO 00/79800 Telefonaktiebolaget L M Ericsson). A number of papers in this respect have also been published, examples being:—
1. "Summarizing Video Using a Shot Importance Measure and a Frame Packing Algorithm", by Shingo Uchihashi et al, in Proc ICASSP 1999, vol 6, pp 3041-3044.
2. "Context Triggered Visual Episodic Memory Prosthesis 2, by Jyrki Hoisko, in Proc ISWC 2000, Atlanta Ga.
3. "Structuring Personal Activity Records Based on Attention-Analyzing Videos from Head Mounted Camera", by Yuichi Nakamura et al, in Proc ICPR 2000, Barcelona.
4. "Video Retrieval and Relevance Feedback in the Context of a Post-Integration Model", by Rucyu Roy Wang et al, in Workshop on Multi-Media Signal Processing (MMSP2001), $3^{rd}$ to $5^{th}$ Oct. 2001, Cannes, France.

However, the most pertinent measure of saliency in many circumstances will be the amount of interest actually felt by the camera user, or the amount of importance actually attached to a picture by the user, and while external clues can give some indication of these factors, they cannot always be assessed accurately and automatically therefrom.

The present invention is concerned with camera apparatus comprising an electronic camera for producing an image signal, and a physically or mechanically operable user control for receiving an input from a user and generating a saliency signal while the image signal is being produced.

European Patent Application No. EP 0 860 980 describes a digital camera with the capability of allowing the user to examine pictures already stored, to decide various parameters, such as the number quality and size of any desired prints, which parameters are then stored for later use. However, as has already been discussed above, this means that the camera user has to review each of the images after they have been taken.

More pertinently, Australian Patent No. 743216 (Canon) discloses a video capture apparatus for capturing a series of video frames comprising a level of interest (LOI) input means operable by the user to generate a LOI signal which is recorded together with the video frames for later use in editing the recorded signals.

As in Canon, the present invention involves an immediate attribution of saliency while the pictures are being taken, and the saliency can be stored with the pictures, so as to reduce the amount of time and effort needed by the user to obtain the most desirable pictures during subsequent editing processes. In some respects, this may be viewed as a development of the conventional camera picture button, where the user operates the button once the required picture is in view, i.e. once it has been decided that the picture has sufficient saliency. Where the saliency signal is stored, this enables relatively easy selection of the requisite picture at a later time from a larger number of images. Furthermore, there is relatively little additional effort in obtaining a multi-valued saliency signal during picture taking, so that refinement of a picture selection process (for example) is possible with little or no additional work once the picture and saliency signals have been recorded.

However, as will be explained later, an immediate attribution of saliency is useful in other ways, such as managing the memory, and controlling the transmission and/or compression of image signals, which features are not available on conventional camera apparatus.

Many cameras incorporate both an on/off switch for energising the camera electronics prior to picture taking, and also a picture taking control. For example, a digital video camera may have an on/off switch which, inter alia, serves to enable the viewing screen, together with a separate picture taking trigger which is operated for taking a video clip. A still photographic film camera, on the other hand, may include a single switch button having a first position for energising the electronics including camera settings such as focus, timing and aperture, and a further position at which the shutter is triggered. In both cases however, there is a clear distinction between the initial energisation step and the control of the picture taking.

It might be considered that the mere operation of the camera button, trigger or other control for picture taking is an indication of saliency, particularly in situations where signal storage is limited. Commonly there is a resulting signal which is at least partly electrical, for example for operating the electronics of an electronic still or video camera to take and store image(s), or even for operating flash on an otherwise purely mechanical camera, and conventionally it will be binary in nature.

However, as mentioned above, it would be desirable to be able to switch a camera on for taking pictures "continuously", for example all the time for video, or at regular periods for a still camera, regardless of the pictures it is taking, and to inspect or otherwise use the stored images at a later date. Under these circumstances, the fact of having the camera picture taking control actuated to provide a binary signal provides no indication whatsoever of the saliency of the stored images.

SUMMARY OF THE INVENTION

Accordingly in a first aspect the apparatus of the present invention provides camera apparatus comprising an electronic camera for producing an image signal, a user operable picture taking control permitting the camera to take pictures, and an additional physically or mechanically operable user control for receiving an input from a user and generating a saliency signal while the image signal is being produced, operation of at least a part of the camera apparatus being arranged to be controlled in response to the (contemporaneous) saliency signal.

Thus the function of operating the camera to take pictures can be separated from the function of providing a saliency signal. In the first aspect of the invention, the saliency signal may be binary, multi-valued or continuous.

In a second closely related aspect the present invention provides camera apparatus comprising an electronic camera for producing an image signal, a physically or mechanically operable user control for receiving an input from a user and generating a saliency signal which has at least three values or is continuously variable while the image signal is being produced, operation of at least a part of the camera apparatus being arranged to be controlled in response to the (contemporaneous) saliency signal.

In the second aspect of the invention the user control may again be separate from a picture taking control of the camera. However in this case an alternative possibility is to use a single control to provide a multi-value signal both to control the camera for picture taking commencing when a lower threshold value thereof is reached, and to employ the higher values thereof as indicative of saliency variations.

The saliency signal is used in real time, e.g. to control operation of the camera apparatus, including image signal processing, selection, or storage. It may additionally or alternatively be stored for later use in image signal processing. The part of the camera apparatus which is controlled is not necessarily part of the camera itself (for example a separate storage or transmission facility) although often it will be.

The user control is either a part of the camera itself, e.g. a part of the body or physically attached coupled or mounted thereto, or a remote user control capable of communicating with the camera or another part of the camera apparatus.

The user control may comprise a control member which is physically movable, as in the depression of a button, the operation of a trigger, or the movement of a slider or rotary knob with or without a self-return mechanism. Alternatively user control may include a control member which comprises a pressure or force sensing transducer such as a piezo-electric sensor.

Where the control member is different from the picture taking control, the control member may be physically coupled to the camera body, or it may be remote from the camera body. In the second aspect of the invention, the control member alternatively replace or is combined with the normal activation or picture taking control, so that a minimum level of the saliency signal is required to commence picture taking (see above).

Where the control member is coupled to the camera body may be directly mounted thereon, for example the slider of a sliding potentiometer, or knob of a rotary potentiometer; or it may include a physically operable portion which is displaced from the body, as for example a remote mechanical release cable attached to sensor such as a physical movement or pressure/force sensor mounted to the camera body; or it may include an attachment separate from the body, for example an electrical trigger attachment operable by movement or force/pressure, which is physically coupled by wire to the electronics of the camera within the body.

Where the control member is remote from the camera body, it may include a movement sensor or a pressure/force sensor, the output of which is coupled by a transmitter to an appropriate receiver on the camera or another part of the camera apparatus by any well known mechanism, such as radio, ultrasound, or infra-red transmission.

The use of a remote user control can be advantageous, particularly where the user is able merely to turn the camera on and leave it on. In such a case, if the camera is suitably mounted either on the user's body (for example in a pair of glasses worn on the head of the user) or at a location remote from the user, the user's hands are freed for most of the time. The remote user control may then be held by the user (for example a control in the form of a key fob), or worn on the user's body or clothing. Exemplary mountings would be as a ring, for example a ring to be worn on the index finger for operation of a slider moving round the ring by the thumb or incorporating a pressure sensor receiving pressure from the thumb, or a pin-on mounting to be worn on the user's tie, jacket, blouse, etc.

The user control may initially provide an electrical output with a continuous range of values, e.g. from a linear or rotary potentiometer (or equivalent such as an arrangement including a Hall effect sensor), or a force/pressure sensor. If desired, this can be converted to a binary or discrete multi-value output, using conventional techniques such as thresholding. Alternatively, the user control may be arranged to provide a binary or discrete multi-value output directly, even from a continuously variable movement or pressure/force, for example a conventional on/off switch, or a switch with multiple contacts.

The saliency signal may likewise have a continuous range of values, or be binary, or have multiple discrete values. It may be derived directly from the output of the user control, or from such output after thresholding. However, it can be derived in other ways. For example, where the user control provides a binary output, the frequency of such output could be converted to a corresponding continuous or discrete multi-value saliency signal.

Another option is to employ the binary output to increment or decrement a discrete multi-value saliency signal. This may require a further control element to instruct whether to increment or decrement, or a centre-biased three-position switch could be provided, for example, the positions either side of the spring biased centre rest position being for continuously or step-wise incrementing and decrementing respectively. Where the prevailing level of the saliency signal is not evident from the physical setting of the control, a small display of the value would be desirable.

The camera apparatus may include at least one other means for developing a saliency signal. This could be a means for developing saliency signal as described in our copending UK Patent Application No. GB 0118595.8 mentioned previously, or even a laughter detector or a glove for measuring skin conductivity. Alternatively or additionally, it could be one or more other physically or mechanically operable user controls operating in a manner similar to that described above in relation to the first user control, and each of the user controls could be associated respectively with a different type of expressed interest, for example interest in people, buildings, or events.

The different individual saliency signals could be combined in real time, or used or recorded separately. Combination of saliency signals could be effected algebraically or logically to give a composite saliency signal; effective combination could also be effected by ascertaining (for example via a look-up table) into what portion of a multidimensional saliency space the saliency signals are jointly located, and developing a composite saliency signal.

Thus the invention also provides an imaging system comprising an electronic camera for producing an image signal, at least two physically or mechanically operable user controls each for receiving an input from a user and generating first and second saliency signals while the image signal is being produced, and saliency circuitry for combining said first and second saliency signals to provide a complex saliency signal. The invention further provides an imaging system comprising an electronic camera for producing an image signal, a physically or mechanically operable user control for receiving an input from a user and generating a first saliency signal while the image signal is being produced, saliency circuitry for generating an image related second saliency signal in response to the image signal, and saliency circuitry for combining the two said saliency signals to provide a complex saliency signal. The complex saliency signal may be employed to control a part of the imaging system as in the earlier aspects of the invention.

In use, the saliency signal(s) can be controlled by the camera user to indicate the amount of interest in the viewed scene as the camera is producing the image signal therefrom, and/or to indicate at which times it is desired preferentially to retain images of the viewed scene. In part, the user's actions may be influenced by the intended use of the saliency signal. In a variation, the saliency signal could be pre-set by the user just prior to picture taking, e.g. where the user is already aware of the likely importance of, or interest in, the pictures.

Where the saliency signal is recorded together with the image signal, later assessment or other processing of the stored images is facilitated. The recorded saliency signal may include a link or pointer to the associated image signal, or it may form part of the associated image signal, e.g. metadata.

Thus, for example the stored saliency figure may be employed:

1. During replay to select for viewing only those portions of the stored image signal which have a saliency level above a threshold level (here and elsewhere "portions of the image signal" encompasses clips from a video signal, or (selected) still images, or both);
2. During replay to select for accelerated viewing those portions of the stored image signal which have a saliency level below a threshold level;
3. During re-recording, in the same memory or another memory, to select only those portions of the stored image signal which have a saliency level above a threshold level, and to reject the remainder of the signal. This could be done automatically during use of the camera to free up portions of the memory containing unwanted signals, and so extend the time during which the camera may be operated.
4. During re-recording to selectively compress the image signal according to the saliency level. This may be done in conjunction with option 3 where there are more than two saliency levels. Highly salient signals may not be compressed at all, or only lightly compressed, whereas signals with little or no saliency can be rejected, or highly compressed.

To be effective, and particularly when the signal is a video signal, options 3 and 4 may need to take account of the current saliency level under consideration and the related historical saliency, i.e. its context. For example, it is probable that a sequence of closely spaced medium saliency periods relates to an action sequence, and so the whole portion of video containing such a sequence should be retained or treated as being more salient than a single isolated period with the same recorded saliency level. This could be done by using some form of integration of the saliency level, with a relatively slow decay, or by some other form of smoothing. It may be necessary to use some form of delay so as to be able to analyse a previous portion of signal once an above-threshold integrated saliency level has been observed, in order to cover the whole of a salient sequence.

Regardless of whether or not it is stored, the real time saliency signal is employed to control the camera itself (this includes options such as selecting when pictures are taken, selection of picture signals for onward transmission and/or storage, and picture signal compression). For example, if the camera is set to take time-lapse still pictures, the frequency of picture taking could be controlled by the saliency level. In another example, if the camera can take both video and also higher resolution still pictures, recordal of still pictures in addition to video may be triggered only when the saliency is above a threshold level.

The saliency signal could also be used in real time to control the amount of compression of the image signal to be recorded or transmitted, and/or to select which parts of the image signal are recorded or transmitted. In this type of operation, it could be appropriate to employ a buffer for the image signal prior to recordal or transmission, in order that some of the previous image signal may also be selected when an above threshold saliency level is detected, i.e. again taking account of the historical context of the saliency level. The buffer size could be adaptively changed depending on the current saliency level, so that during periods of relatively high saliency a larger portion of the image signal is stored in the buffer for potential recordal or transmission.

The level of saliency required for different actions may be different. For example, where a camera is both transmitting and recording an image signal, the saliency level necessary for transmission may be greater than the level required for storage at the camera.

In addition, the invention provides an electronic camera having a picture taking control for enabling the camera to supply picture signals, the camera being further provided with a user operable control for generating a saliency signal, and a compression circuit for compressing the picture signals to an extent determined by the saliency signal.

Furthermore, the invention provides an electronic camera having a picture taking control for enabling the camera to supply picture signals, the camera being further provided with a user operable control for generating a saliency signal, and a buffer for receiving the picture signals and having a length in response to the saliency signal.

The invention also provides an electronic camera having a picture taking control for enabling the camera to supply picture signals, the camera being further provided with a user operable control for generating a saliency signal, and a picture selection circuit for selectively passing the picture signals in response to the saliency signal.

The invention yet further provides an electronic camera having a picture taking control for enabling the camera to supply picture signals, the camera being further provided with a user operable control for generating a saliency signal, and a memory arranged for selectively retaining images associated with higher saliency levels in said memory in preference to images with lower saliency levels.

BRIEF DESCRIPTION OF THE DRAWINGS

Other features and advantages of the invention will become apparent upon a perusal of the appended claims, to which the reader is referred, and also upon a reading of the following more detailed description of embodiment of the invention, in which:

DETAILED DESCRIPTION OF THE DRAWING

Figure 1:
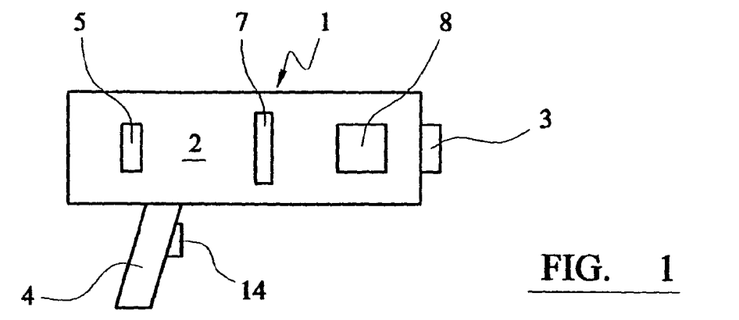
FIG. 1 shows in outline schematic form an electronic video camera for use in an embodiment of apparatus according to all three aspects of the invention.
Figure 2:
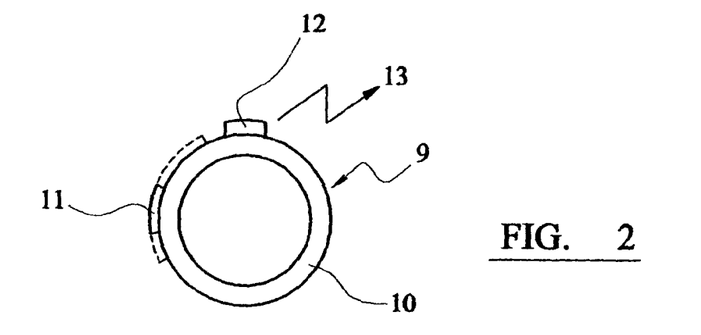
FIG. 2 shows in outline schematic form a physically operable remote saliency control for use in the camera of FIG. 1.

The video camera 1 of FIG. 1 comprises a main body 2 at the front of which is mounted the lens 3 and to which, nearer the rear end, is attached a grip 4 including a manual operating (picture taking) button or trigger 14. A three position rotary or slider switch 5 is mounted on the body 2, the first position $5_1$ being "OFF", the second position $5_2$ providing a manual control signal 6, and the third position $5_3$ providing a continuous control signal 7, see FIG. 3. Also provided on the camera body 2 is a remote signal sensor 8. A viewing screen 7 is arranged on the body so that in use it extends sideways from the camera body. FIG. 2 shows a remote user control 9 suitable for use with the camera of FIG. 1 when the switch 5 is in its third position. As shown, it comprises a ring 10 intended to be worn on the index finger of the user. A potentiometer with a knob 11 slidable about the ring circumference within a range indicated by the dashed lines is mounted on the ring for operation by the user's thumb, and the potentiometer is coupled to a transducing arrangement 12 which reads the continuously variable potentiometer setting, converts it to a digital value with a desired degree of resolution, and transmits the digital value as an appropriately coded signal 13. By way of example only, there may be 4 digital values within the potentiometer movement range, and the transmission is by infra-red, ultrasonic or radio waves. Preferably, the potentiometer includes gentle click stops for the knob 11 corresponding to each of the 4 digital values.

It will be appreciated that the control 9 could take an alternative form to ring 10, for example a tie pin, badge or brooch, and that the slidable mechanism could be replaced for example by a rotary one. Also a transducer other than a potentiometer could be used, for example a multi-position switch. In another embodiment, the transducer is a piezoelectric pressure sensor.

Figure 3:
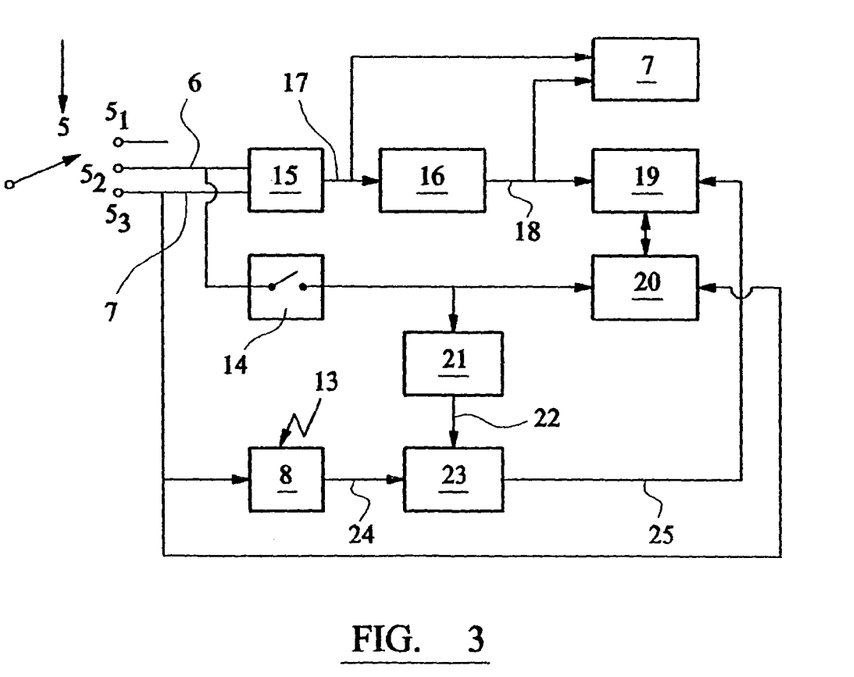
FIG. 3 shows in outline schematic form the circuitry of the camera of FIG. 1.

The circuitry within the camera is generally shown in FIG. 3, where the first position $5_1$ of the switch 5 merely turns everything off. Signals 6 and 7 are coupled to an OR gate 15 to produce a camera on signal 17, so that in either the second or third position of switch 5 the image sensor turns the camera electronics on, including an imaging sensor 16 receiving light from the lens 3 and the viewing screen 7. It will be appreciated that the signal 17 is coupled to other circuitry of the camera, including some of the other components shown in FIG. 3, although for simplicity these connections are omitted. The screen 7 is coupled to receive the image signal 18 from the image sensor 16 so that the viewing screen can show at that stage what the camera is seeing.

The camera circuitry also comprises a memory 19 which is coupled to receive the image signal 18, but which is arranged only to store the signal when so instructed by an image control circuit 20.

With the switch in the second position, the user can depress the trigger or button 14 in the grip 4 to transmit the manual control signal 6 to the memory control circuit 20 so that the memory is activated to store the image signal 18 in the normal way. As shown, switch 14 is a simple mechanical single pole switch, but any equivalent mechanical or electrical arrangement could be used. A further maximum saliency generator 21 is arranged to respond to the presence of an output from switch 21, and generates a maximum saliency signal 22 which is fed to a comparator 23. Comparator 23 receives a second input 24, and provides a saliency output 25 equal to the value of the greater of the two inputs 22, 24, the output 25 also being fed to the memory 19 to be associated with the image signal being stored. For example, both signals 18 and 25 may be provided with the same time stamp. In an alternative form of apparatus, the signal 25 may be inserted into the existing image signal 18 in known manner prior to storage in memory 19.

When the switch is in the third position $5_3$ the continuous control signal 7 is used to enable the remote receiving sensor 8 for receiving and decoding a signal from the remote control 9 to provide a multi-level digital saliency signal 24 to the comparator 23. Signal 7 is also coupled to the memory control circuit 20 to instruct the memory continuously to record the image signal 18 together with the saliency output 25.

Thus, when the switch 5 is in the second position $5_2$ the camera is operative to store image signals 18 and an associated maximum saliency output 25 only when the button 14 is operated. When the button is not operated, no storage of image or saliency signals occurs, and the signal 22 assumes a zero saliency value.

When the switch 5 is in the third position $5_3$ the camera is operative continuously to store image and saliency signals as received from the image sensor 16 and the receiver 8 respectively. During this operation, should the button 14 be depressed, the maximum saliency signal 22 will predominate in the comparator and will be stored in the memory with the image signal. It will be understood that the circuit 21 is arranged to provide a maximum saliency signal, e.g. equivalent to or greater than the maximum signal received from the transmitter 9, since it is likely that operation of the button 14 has occurred because the user recognises a scene of high salience.

The memory control circuit is also arranged periodically to check the amount of used memory. When this reaches a threshold figure, it co-operates with the memory 19 by rejecting stored images with associated low saliency levels (below a predesignated threshold level) and rearranging the remaining stored image signals to maximise memory availability. In an alternative embodiment, the control circuit 20 also includes one or more image coders, and when the memory is becoming full it begins to code the stored images with a degree of reproducibility determined by the associated saliency level, so that low saliency images are stored with minimal memory and correspondingly low resolution in the reproduced image, whereas high saliency signals are coded and stored with greater memory occupancy so as to be capable of being more faithfully reproduced.

In a variation of the embodiment of FIGS. 1 to 3, the saliency signal is a binary signal only. In such a case, the potentiometer of FIG. 2 may be replaced by a simple make switch for actuation by pressure from the user's thumb, the output of the switch enabling the transmitter to output a signal. At the camera, the comparator 23 may be replaced by a simple OR circuit. The image signals are therefore stored in memory 19 together with a two-level saliency signal, and at a later stage the higher value of the latter signal may be used to select the associated images so to skim through the stored images and pick out those considered at the time to be more interesting.

Figure 4:
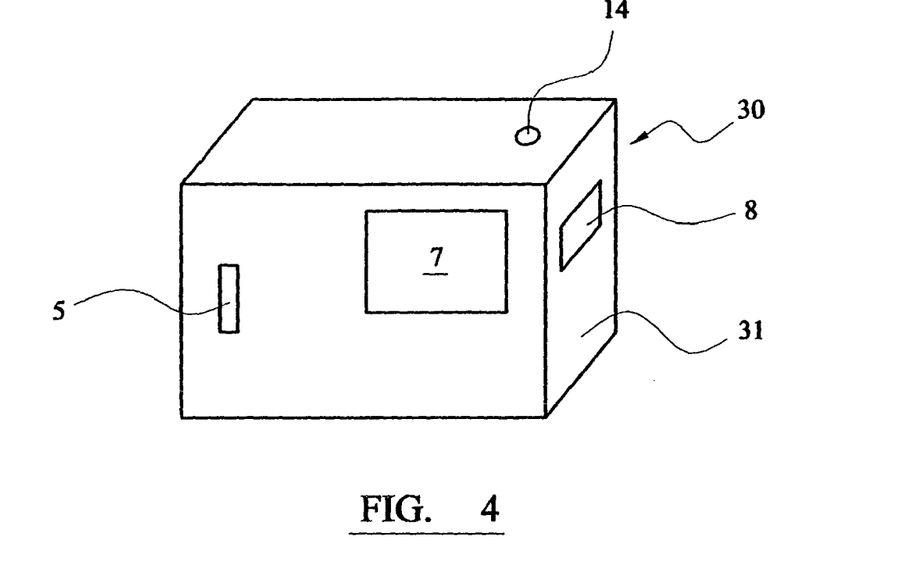
FIG. 4 shows in schematic perspective view an electronic still camera for use in an embodiment of apparatus according to all three aspects of the invention.
Figure 5:
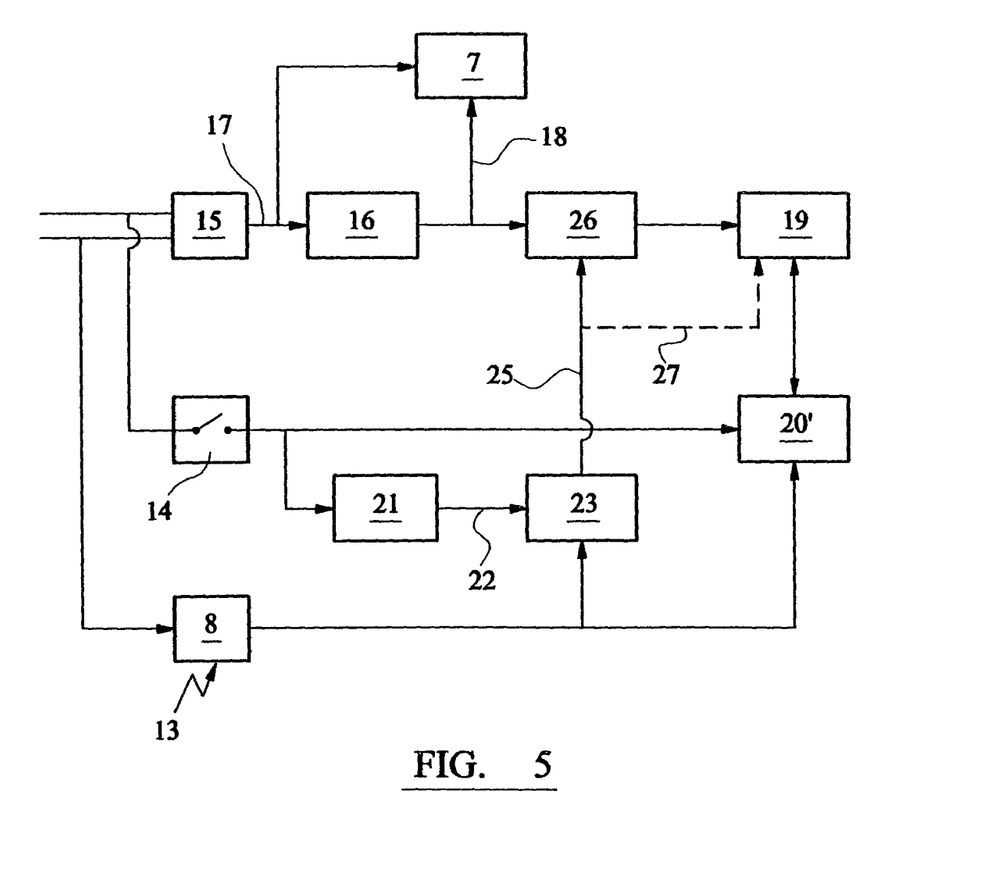
FIG. 5 shows in outline schematic form the circuitry of the camera of FIG. 4.

FIGS. 4 and 5 relate to an electronic still camera in which the rate of image acquisition and storage is controlled by a saliency signal. The saliency signal may or may not be stored together with the image signal. In these Figures the same numerals will be used for electrical components common to the embodiment of FIGS. 1 to 3.

FIG. 4 shows a rear view of the electronic still camera 30 having a body 31 on the rear surface of which is an electronic viewfinder 7 and the vertical slider of a three position switch 5. On the top of the body is a picture taking button 14, and on the right hand side of the body is a remote receiving transducer 8 for receiving a multi-value saliency signal from a remote transmitter such as the one shown in FIG. 2.

Much of the camera circuitry shown in FIG. 5 is similar to that of FIG. 3. However, a variable compression circuit is arranged between the image sensor 16 and the memory 19 and is controlled by the output of comparator 23. As shown, the output of comparator 23 is not coupled to the memory 19, although an optional connection is shown in dashed lines. Thus the saliency signal is not necessarily stored in memory 19 but it does determine the compression of the stored images. It is also used to determine the rate of image storage The first position $5_1$ of the switch turns all of the circuitry off.

The second position $5_2$ turns the camera electronics on and enables the viewer 7. The button 14 is coupled to a first input of a memory control circuit 20' so that when the button is depressed the control circuit enable storage of a single still image in memory 19. Since the maximum saliency signal generator is operative, the compression circuit 26 is controlled to provide relatively little or no compression of the image signal.

When the switch is in the third position $5_3$ the camera circuitry including the receiving transducer 8 is also energised, and the received saliency signal 24 is passed to a second input of the memory control circuit 20', which enables storage of images in memory 19 according to the value of signal 24. In particular, when no signal 24 is present, or it has a below threshold value, no images are stored (or images are stored at a lowest rate), but above a threshold value image storage commences with a frequency which increases with the value of signal 24.

In a variation, the saliency signal has only two levels, and the rate of image storage correspondingly varies between a lower (zero or finite) rate, and a higher rate.

When the switch is in the third position $5_3$ the camera can be operated for single picture taking using the button 14, at which time it is assumed that the saliency is at a maximum, or by use of the remote transmitter 9.

It will be appreciated that the remote receiver 8 of either embodiment could be replaced by a user control on the camera itself providing the saliency signal directly to the camera electronics, or that the wireless coupling could be replaced by a hard wired connection.

Furthermore, although in the embodiments both the video and saliency signals are directed to processing circuitry and/or a memory within the camera itself, these signals may be transmitted by the camera for remote processing and/or storage if desired. Indeed, it would be possible to distribute the processing circuitry and/or memory between the camera and a remote location (for example storing the video signal in the camera and storing the saliency signal remotely), provided there is a means of retaining an indication of synchronicity between the signals, for example by referencing both signals to the camera time stamp, which would thus need to be transmitted the remote location.

The invention claimed is:

1. An apparatus comprising:
    an electronic camera to produce an image signal;
    a first user operable control to selectively activate the electronic camera to take pictures;
    a plurality of second user operable controls to receive corresponding inputs from a user and to generate, in response to the input from the user, a plurality of saliency signals to indicate user interest in a picture, each saliency signal to have at least one of (a) a value selected from at least three different discrete values; or (b) a value selected from a continuous range of values;
    a circuit to record the value of each saliency signal based on the input received via each second control contemporaneously with activation of the first control, and to generate a composite saliency signal from the saliency signals;
    a memory arranged to store the image signal, the composite and the saliency signals; and,
    replay circuitry to replay the pictures such that the pictures having composite saliency signal signals below a threshold are played back in an accelerated manner for accelerated viewing thereof,
    wherein at least one operation of the apparatus is controlled based on the composite saliency signal, the at least one operation being different from recording the values of the saliency signals in the memory.

2. An apparatus according to claim 1, further comprising compression circuitry to compress the image signal to an extent determined by the composite saliency signal.

3. An apparatus according to claim 1, further comprising a buffer to receive the image signal, the buffer having a capacity controlled by the value of the composite saliency signal.

4. An apparatus according to claim 1, further comprising image selection circuitry to receive the composite saliency and image signals and to selectively pass the image signal based on the composite saliency signal.

5. An apparatus according to claim 1, further comprising management circuitry to selectively retain in the memory images associated with higher composite saliency levels in preference to images with lower saliency levels.

6. An apparatus according to claim 2, further comprising management circuitry selectively retain in the memory images associated with higher saliency levels in preference to images with lower saliency levels.

7. An apparatus according to claim 1, wherein the first user control includes a normal picture taking control on the electronic camera.

8. An apparatus according to claim 1, further including circuitry to incorporate the composite saliency signal in the image signal.

9. An apparatus according to claim 1, wherein the second user control is part of the body of the electric camera or is physically attached to the body of the electronic camera.

10. An apparatus according to claim 1, wherein the second user control is a remote control for communicating with the electronic camera.

11. An apparatus according to claim 1, wherein the second user control comprises a physically movable control member and a sensor arranged to be responsive to movement of the control member.

12. An apparatus according to claim 1, wherein the second user control comprises a pressure or force sensing transducer to determine the value of one of the saliency signals.

* * * * *

UNITED STATES PATENT AND TRADEMARK OFFICE
CERTIFICATE OF CORRECTION

PATENT NO. : 8,068,143 B2  
APPLICATION NO. : 10/696567  
DATED : November 29, 2011  
INVENTOR(S) : Maurizio Pilu et al.

Page 1 of 1

It is certified that error appears in the above-identified patent and that said Letters Patent is hereby corrected as shown below:

In column 11, line 26, in Claim 1, delete "composite" and insert -- composite saliency signal, --, therefor.

In column 11, line 29, in Claim 1, delete "signal signals" and insert -- signal --, therefor.

In column 12, line 24, in Claim 9, delete "electric" and insert -- electronic --, therefor.

Signed and Sealed this
Eleventh Day of September, 2012

David J. Kappos
*Director of the United States Patent and Trademark Office*